(12) United States Patent
Kaule et al.

(10) Patent No.: US 7,986,459 B2
(45) Date of Patent: Jul. 26, 2011

(54) GRID IMAGE AND METHOD FOR THE PRODUCTION THEREOF

(75) Inventors: Wittich Kaule, Emmering (DE); Marius Dichtl, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 311 days.

(21) Appl. No.: 11/995,228

(22) PCT Filed: Jul. 4, 2006

(86) PCT No.: PCT/EP2006/006489
§ 371 (c)(1),
(2), (4) Date: Jan. 10, 2008

(87) PCT Pub. No.: WO2007/006455
PCT Pub. Date: Jan. 18, 2007

(65) Prior Publication Data
US 2008/0198468 A1   Aug. 21, 2008

(30) Foreign Application Priority Data
Jul. 14, 2005  (DE) .......................... 10 2005 032 997

(51) Int. Cl.
*G02B 5/18* (2006.01)

(52) U.S. Cl. ............. 359/575; 359/2; 359/569; 359/567
(58) Field of Classification Search .............. 359/2, 575, 359/569, 566, 567
See application file for complete search history.

(56) References Cited

U.S. PATENT DOCUMENTS

| | | | | |
|---|---|---|---|---|
| 5,243,444 A * | 9/1993 | Fan | ............................... | 358/3.08 |
| 5,784,200 A * | 7/1998 | Modegi | ......................... | 359/567 |
| 6,157,487 A * | 12/2000 | Staub et al. | .................... | 359/567 |
| 6,342,969 B1 * | 1/2002 | Lee | ................................ | 359/569 |
| 6,560,017 B1 * | 5/2003 | Bianco | ........................... | 359/566 |
| 7,746,558 B2 | 6/2010 | Kaule | | |
| 2005/0123755 A1* | 6/2005 | Argoitia et al. | .............. | 428/402 |
| 2006/0152807 A1 | 7/2006 | Kaule | | |
| 2007/0165182 A1 | 7/2007 | Hoffmuller | | |
| 2007/0211238 A1 | 9/2007 | Hoffmuller | | |
| 2007/0216518 A1 | 9/2007 | Hoffmuller | | |
| 2007/0229928 A1 | 10/2007 | Hoffmuller | | |
| 2007/0241553 A1 | 10/2007 | Heim | | |
| 2007/0246933 A1 | 10/2007 | Heim | | |
| 2007/0274559 A1 | 11/2007 | Depta | | |

(Continued)

FOREIGN PATENT DOCUMENTS

EP        0357837        3/1990

(Continued)

OTHER PUBLICATIONS

International Search Report, International Application No. PCT/EP2006/006489, 3 pages, Jan. 5, 2007.

(Continued)

*Primary Examiner* — Joshua L Pritchett
(74) *Attorney, Agent, or Firm* — Greenlee Sullivan P.C.

(57) ABSTRACT

The present invention relates to a grating image (12) for depicting at least one unscreened halftone image having multiple brightness levels, the grating image exhibiting multiple grating fields (22-1, 22-2, 22-3) that include in each case an electromagnetic-radiation-influencing grating pattern composed of a plurality of grating lines and that, when illuminated, produce in each case an areal region of the halftone image having the same brightness level.

36 Claims, 4 Drawing Sheets

U.S. PATENT DOCUMENTS

Figure 1:
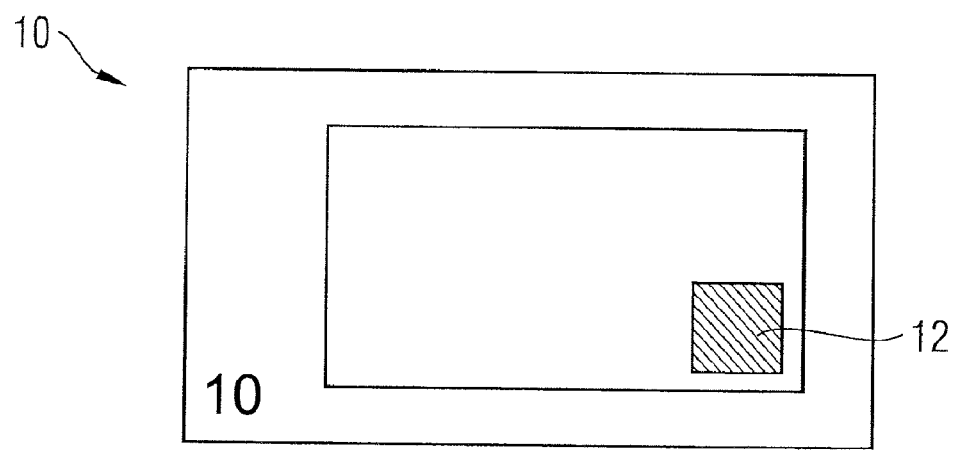

| | | |
|---|---|---|
| 2008/0014378 A1 | 1/2008 | Hoffmuller |
| 2008/0054621 A1 | 3/2008 | Burchard |
| 2008/0079257 A1 | 4/2008 | Fessl |
| 2008/0088859 A1 | 4/2008 | Depta |
| 2008/0160226 A1 | 7/2008 | Kaule |
| 2008/0163994 A1 | 7/2008 | Hoppe |
| 2008/0198468 A1 | 8/2008 | Kaule |
| 2008/0216976 A1 | 9/2008 | Ruck |
| 2008/0250954 A1 | 10/2008 | Depta |
| 2008/0258456 A1 | 10/2008 | Rahm |

FOREIGN PATENT DOCUMENTS

| | | |
|---|---|---|
| EP | 0423680 | 4/1991 |
| EP | 0585966 | 3/1994 |
| WO | WO 03/106189 | 12/2003 |
| WO | WO 03/107047 A1 | 12/2003 |
| WO | WO 2005/038499 | 4/2005 |
| WO | WO 2005/038500 | 4/2005 |
| WO | WO 2005/071444 | 8/2005 |
| WO | WO 2005105473 | 11/2005 |
| WO | WO 2005105474 | 11/2005 |
| WO | WO 2005105475 | 11/2005 |
| WO | WO 2005108106 | 11/2005 |
| WO | WO 2005108108 | 11/2005 |
| WO | WO 2005108110 | 11/2005 |
| WO | WO 2006005434 | 1/2006 |
| WO | WO 2006015733 | 2/2006 |
| WO | WO 2006018171 | 2/2006 |
| WO | WO 2006018172 | 2/2006 |
| WO | WO 2006040069 | 4/2006 |
| WO | WO 2006/066731 | 6/2006 |
| WO | WO 2006056342 | 6/2006 |
| WO | WO 2006072380 | 7/2006 |
| WO | WO 2006087138 | 8/2006 |
| WO | WO 2006099971 | 9/2006 |
| WO | WO 2006119896 | 11/2006 |
| WO | WO 2006128607 | 12/2006 |
| WO | WO 2007006445 | 1/2007 |
| WO | WO 2007006455 | 1/2007 |
| WO | WO 2007076952 | 7/2007 |
| WO | WO 2007079851 | 7/2007 |
| WO | WO 2007115648 | 10/2007 |

OTHER PUBLICATIONS

International Preliminary Report on Patentability, International Application No. PCT/EP2006/006489, 10 pages (English Translation).

U.S. Appl. No. 11/568,538, filed Sep. 23, 2008, Depta, WO 2005/108110.

U.S. Appl. No. 11/719,843, in pre-exam, Kaule, WO 2006/056342.

U.S. Appl. No. 11/909,115, filed Sep. 19, 2007, Kretschmar, WO 2006/099971.

U.S. Appl. No. 11/995,227, in pre-exam, Gruszczynski, WO 2007/006445.

U.S. Appl. No. 12/097,834, filed Jun. 17, 2008, Kaule, WO 2007/076952.

U.S. Appl. No. 12/294,222, in pre-exam, Hoffmuller, WO 2007/115648.

Office Action, European Patent Application No. 06762381.9, May 17, 2010, 6 pages.

Rai-Choudhury P, "Microlithography, Micromachining and Microfabrication," Jan. 1, 1997, Handbook of Microlithography, Micromachining, and Microfabrication, vol. 1: Microlithography, Belligham, SPIE, US, pp. 1-16.

Kipphan, Helmut (Ed.), *Handbook of Print Media, Technologies and Production Methods*, Springer, Heidelberg, pp. 90-91, 1122, Sep. 2001.

* cited by examiner

GRID IMAGE AND METHOD FOR THE PRODUCTION THEREOF

CROSS-REFERENCE TO RELATED APPLICATIONS

This application is the U.S. National Stage of International Application No. PCT/EP2006/006489, filed Jul. 4, 2006, which claims the benefit of German Patent Application DE 10 2005 032 997.7, filed Jul. 14, 2005, all of which are hereby incorporated by reference to the extent not inconsistent with the disclosure herewith.

The present invention relates to a grating image for depicting at least one halftone image, and a method for manufacturing such grating images.

It is known to use holograms, holographic grating images and other hologram-like diffraction patterns for safeguarding the authenticity of credit cards, value documents, product packaging and the like. In general, such diffraction patterns are manufactured by exposing a light-sensitive layer to superimposed coherent radiation. True holograms are created in that an object is illuminated with coherent laser light and the laser light scattered by the object is superimposed in the light-sensitive layer with an uninfluenced reference beam.

If, on the other hand, the superimposed light beams in the light-sensitive layer consist of spatially extended, uniform coherent wave fields, then holographic diffraction gratings are created upon superimposition. The action of the superimposed wave fields on the light-sensitive layer, such as a photographic film or a photoresist layer, produces a holographic diffraction grating there that can be preserved, for example, in the form of light and dark lines in a photographic film or in the form of peaks and valleys in a photoresist layer. Since, in this case, the light beams are not scattered by an object, the holographic diffraction grating produces merely an optically variable color impression, but no image depiction.

On the basis of holographic diffraction gratings, it is possible to produce holographic grating images by not covering the entire area of the light-sensitive material with a uniform holographic diffraction grating, but rather by using suitable masks to cover, in each case, only fractions of the recording area with one of multiple different uniform grating patterns. Such a holographic grating image is thus composed of multiple grating fields having different diffraction grating patterns. With such a holographic grating image, it is possible to depict a plurality of different image motifs through a suitable arrangement of the grating fields.

The diffraction grating patterns of a holographic grating image are usually line gratings having a plurality of parallel grating lines that lie next to each other. The diffraction gratings of each grating field or each grating image region are characterized by the grating constant and the angular orientation of the grating pattern and the outline or the contour of the region. The angular orientation of the grating pattern is usually described by the azimuth angle, that is, the angle between the parallel grating lines and an arbitrarily defined reference direction. In holographic diffraction gratings, the grating constant and the azimuth angle are usually set via the wavelength and the direction of incidence of the exposing wave fields, and the outlines of the fields produced with the aid of exposure masks.

Generally, it can be said that the grating constant of the grating pattern in a grating image region is fundamental to the color of this region when viewed, while the azimuth angle is responsible for the visibility of the image region from certain directions. Thus, optically variable images, such as alternating or motion images, or also images that appear three-dimensional, can be produced based on this technology.

Halftone grating images are traditionally executed in the so-called dot matrix method that is described, for example, in publication EP 0 423 680 A2. Here, the halftone grating image is made up of a plurality of small, nearly punctiform regions that typically exhibit a diameter of 10 μm to 200 μm. In these dot regions, holographic diffraction gratings are produced with a so-called dot matrix hologram machine. However, such dot matrix hologram machines can now be bought commercially and are thus accessible also to potential counterfeiters.

Based on this, the object of the present invention is to propose a grating image of the kind mentioned above that exhibits increased counterfeit security and that can depict halftone images with high optical quality. Furthermore, it is intended to specify a method for manufacturing such grating images.

This object is solved by the grating image having the features of the main claim. A method for manufacturing such a grating image and an object having such a grating image are specified in the coordinated claims. Developments of the present invention are the subject of the dependent claims.

According to the present invention, a generic grating image is designed for the depiction of at least one unscreened halftone image having multiple brightness levels, the grating image exhibiting multiple grating fields. The grating fields include in each case an electromagnetic-radiation-influencing grating pattern composed of a plurality of grating lines. When illuminated, the grating fields produce in each case an areal region of the halftone image having the same brightness level.

Here, the present invention is based on the idea of increasing the counterfeit security of halftone grating images by avoiding any screening. While dot matrix apparatuses for manufacturing screened grating images are commercially available and are thus available to a broad group of people, covering areal, irregularly edged regions with grating patterns is considerably more complex and not possible for everyone. When viewing a halftone grating image with a magnifier, an existing screening can be perceived, and it is thus easily possible to check the authenticity of a halftone grating image that is known to be unscreened.

In addition to the aspect of counterfeit security, the dot-matrix breakdown also leads to gaps and separation points in the grating image that are not predefined by the motif. An unscreened image depiction can thus achieve a higher optical quality, especially a higher luminosity and clearer color or brightness level depiction of the grating image.

To achieve a clear difference from screen images, it has proven to be advantageous when the unscreened halftone image exhibits only a few brightness levels, especially fewer than ten brightness levels. Unscreened halftone images having three, four or five brightness levels have proven to be particularly good.

Advantageously, the grating fields at least partially include grating patterns that are defined by a grating constant and an angular orientation, as explained in detail below. Alternatively, or in addition, the grating fields can also at least partially include grating patterns that form a matte pattern that, when viewed, displays no diffractive effects. In this way, areal regions having a matte appearance can easily be integrated into an electron beam lithographically produced grating image.

To form a matte pattern, the grating lines in the grating fields are expediently oriented randomly to each other. In particular, the orientation of the grating lines varies randomly and discontinuously. More precise details for the manufacture and the properties of such matte patterns are specified in PCT/EP2005/000659, whose disclosure in this respect is incorporated in the present application.

To reconstruct the desired brightness of a grating field upon illumination, the grating fields are preferably filled with the respective grating patterns in an areal fraction that corresponds to the brightness level produced. For this, the grating fields advantageously exhibit, corresponding to the brightness level produced, nested regions that are filled with grating patterns and regions that are unfilled.

According to an advantageous variant of the present invention, in at least one dimension, the extent of the filled and unfilled regions lies below the resolution limit of the naked eye. In particular, the filled and unfilled regions can be formed as narrow strips having a width below the resolution limit of the eye, or as small areal elements of any shape having a size below the resolution limit of the eye.

In alternative embodiments, the structure of the filled and unfilled regions can be visible. In this case, the form and size of the regions are chosen such that they do not disrupt the image impression, but rather preferably further support and, for example, contribute to a woodcarving-like or copperplate-engraving-like image impression.

The grating fields that form a matte pattern can also be completely filled with grating lines, and this in a density that corresponds to the brightness level produced.

The grating patterns are preferably at least partially formed from uninterrupted grating lines and produced by means of a lithography instrument. Here, the grating lines are expediently connected, by turning sections disposed at their ends, to at least one grating line that runs in a meander shape.

According to an advantageous development, in different orientations, the grating image depicts in each case an image, especially an unscreened halftone image, such that an alternating image, a motion image, a stereo image, a backdrop image or a grating image having a constant image impression when in motion is created for the viewer. In addition, at least one of the unscreened halftone images depicted by the grating image can be a true-color image.

The present invention also includes a method for producing a grating image that displays at least one unscreened halftone image having multiple brightness levels. In the method according to the present invention, the grating image is produced having multiple grating fields that include in each case an electromagnetic-radiation-influencing grating pattern composed of a plurality of grating lines and that, when illuminated, produce in each case an areal region of the halftone image having the same brightness level.

Starting from a screened black-and-white halftone image, in a preferred method variant,
a) a screened black-and-white halftone image having a plurality of pixels is predefined, the pixels exhibiting in each case a gray-brightness value,
b) the pixels whose brightness values lie in a predefined interval are combined in each case to form an image field such that an unscreened brightness level image having a prechosen number of discrete brightness levels is created,
c) grating fields of the grating image are defined that are allocated to the combined image fields and whose arrangement within the grating image corresponds to the arrangement of the image fields in the predefined halftone image, and
d) the grating fields are filled with grating patterns that, when illuminated, produce in each case an areal region of the same brightness level within the unscreened brightness level image.

Starting from a screened color halftone image, in a further, likewise preferred method variant,
a) a screened color halftone image having a plurality of pixels is predefined, the pixels exhibiting in each case brightness values for certain primary colors,
b) for each primary color, the pixels whose brightness values for this primary color lie in a predefined interval are combined in each case to form an image field such that, for each primary color, an unscreened color separation level image having a prechosen number of discrete brightness levels is created,
c) grating fields of the grating image are defined that are allocated to the combined image fields and whose arrangement within the grating image corresponds to the arrangement of the image fields in the predefined color halftone image, and
d) the grating fields are subdivided into color sub-regions for the primary colors and the color sub-regions are filled with grating patterns that, when illuminated, each produce an areal region of the same brightness level of the primary color within the unscreened brightness level image for this primary color.

Advantageously, spectral colors, especially red, green and blue, are chosen as primary colors. Here, the extent of the color sub-regions, in at least one dimension, is expediently chosen to be below the resolution limit of the naked eye. For this, the color sub-regions can be formed, for example, as narrow strips having a width below the resolution limit of the naked eye, or by small areal elements of any shape having a size below the resolution limit of the naked eye.

Planar or curved grating images of the kind described can be produced easily and non-holographically in that an orientation for the grating image in space is first defined in which the unscreened halftone image is to be visible. In step d), one or more sub-regions are then defined within each grating field, and for each of the sub-regions, from the defined orientation of the grating image and of the brightness value of the grating field, a grating pattern having a grating constant and an angular orientation is defined using the relationship $$\vec{n}(\vec{r}) \times (\vec{k}'(\vec{r}) - \vec{k}(\vec{r})) = m\vec{g} \qquad (L)$$

wherein $\vec{r}$ represents a reference test point in the sub-region of the grating image, $\vec{n}(\vec{r})$, $\vec{k}'(\vec{r})$ and $\vec{k}(\vec{r})$ the normal vector, the viewing vector and the illumination vector at the reference test point $\vec{r}$, m the diffraction order and $\vec{g}$ the grating vector for the sub-region.

In the specified relationship, (L) represents the illumination vector $\vec{k}(\vec{r})$, a vector of the length $2\pi/\lambda$, whose direction is given by the connecting line between an illumination point and the reference test point of the sub-region in each case. Here, $\lambda$ is the chosen wavelength, from the spectrum of the incident light, that is required for producing the true color. The viewing vector $\vec{k}'(\vec{r})$ is a vector of the length $2\pi/\lambda$, whose direction is given by the connecting line between the reference test point of the sub-region in each case and a viewing point. The grating pattern is characterized by the grating vector $\vec{g}$, which represents a vector of the length $2\pi/a$, which points in the direction parallel to the grating lines. Here, a is the grating constant, that is, the spacing of the grating lines. The position of the, in the general case, curved grating image in space is specified by the normal vector $\vec{n}(\vec{r})$, which represents a vector of length 1 that stands vertical on the local grating plane.

The formula (L) establishes a relationship between the grating constant and the diffracted wavelength, accounting for the angle between the illumination direction, viewing direction and grating position in space. The vector formula (L) is independent of coordinate systems. The vectors can lie in any way in space. The relationship (L) can be depicted in various ways depending on the choice of coordinate system and the concrete variables used for description.

The local relationship (L) describes, in the most general form, the correlation between the local, locus-dependent vectors. In many situations, the local vectors can be replaced by constant, global vectors and the calculation thus simplified. In particular, under certain conditions, the local relationship (L) can be replaced by the simpler, global relationship $$\vec{n} \times (\vec{k}' - \vec{k}) = m\vec{g} \qquad (G).$$

Further details are specified in PCT/EP2004/011497 and in German patent applications 10 2004 006 771.6 and 10 2004 060 672.2, whose disclosures in this respect are incorporated in the present application.

If the predefined halftone image is a color image, then, expediently, after the orientation of the grating image in space is defined in step d), one or more further sub-regions within the color sub-regions of each grating field are defined and a grating pattern having a grating constant and an angular orientation is determined for each of the further sub-regions from the defined orientation of the grating image, of the primary color and of the brightness value of the color sub-region using the relationship (L), wherein $\vec{r}$ represents a reference test point in the sub-region of the grating image, $\vec{n}(\vec{r})$, $\vec{k}'(\vec{r})$ and $\vec{k}(\vec{r})$ the normal vector, the viewing vector and the illumination vector at the reference test point $\vec{r}$, m the diffraction order and $\vec{g}$ the grating vector for the further sub-region.

In different orientations, the grating image can display multiple images, especially multiple unscreened halftone images, the cited steps being carried out for each of the multiple images. The grating fields of the multiple images are then expediently nested within each other, for which the grating fields are preferably broken down into narrow strips and the narrow strips of the grating fields belonging to different images are disposed alternatingly next to each other. The width of the narrow strips is advantageously chosen to be below the resolution limit of the naked eye, the narrow strips preferably being oriented parallel to a spin or tilt axis of the grating image. Alternatively, the grating fields can also be broken down into small fractional regions of any shape, and the small fractional regions of the grating fields disposed nested within each other. In this case, at least one characteristic measurement of the small fractional regions is expediently chosen to be below the resolution limit of the naked eye.

The present invention also comprises an object having a grating image produced according to the described method. In a preferred embodiment, the object constitutes a security element for application to a data carrier, especially a security thread, a label or a transfer element. It is likewise preferred when the object is a data carrier, especially a banknote, a value document, a passport, an identification card or a certificate. Especially in the region of the grating image, the object can be curved, for instance cylindrically curved.

Further exemplary embodiments and advantages of the present invention are described below with reference to the drawings. To improve clarity, a depiction to scale and proportion was dispensed with in the drawings.

Figure 2:
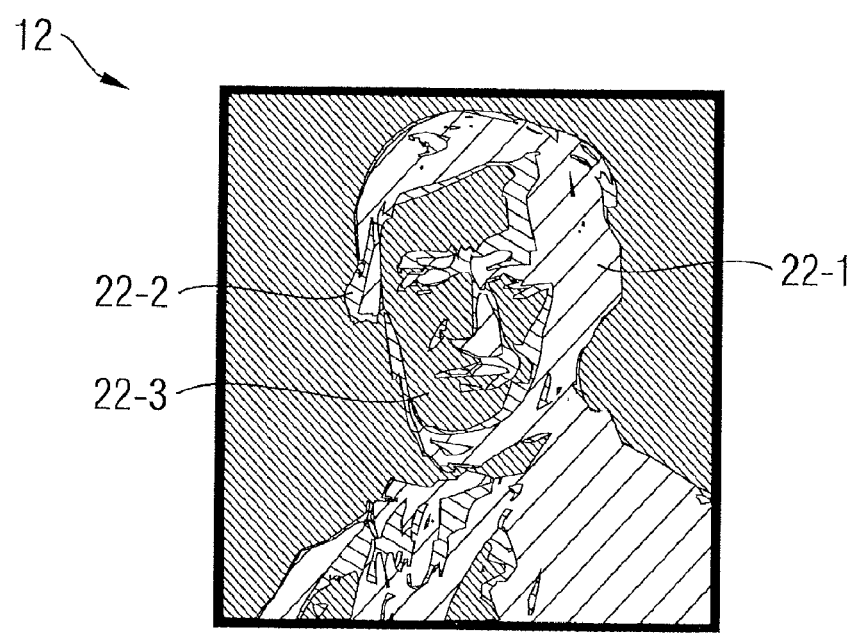
Figure 3A:
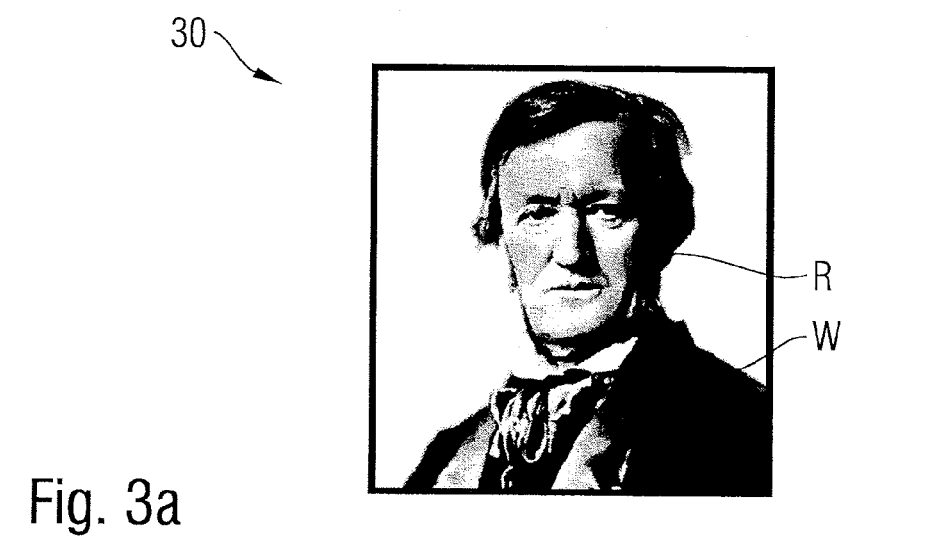
Figure 3B:
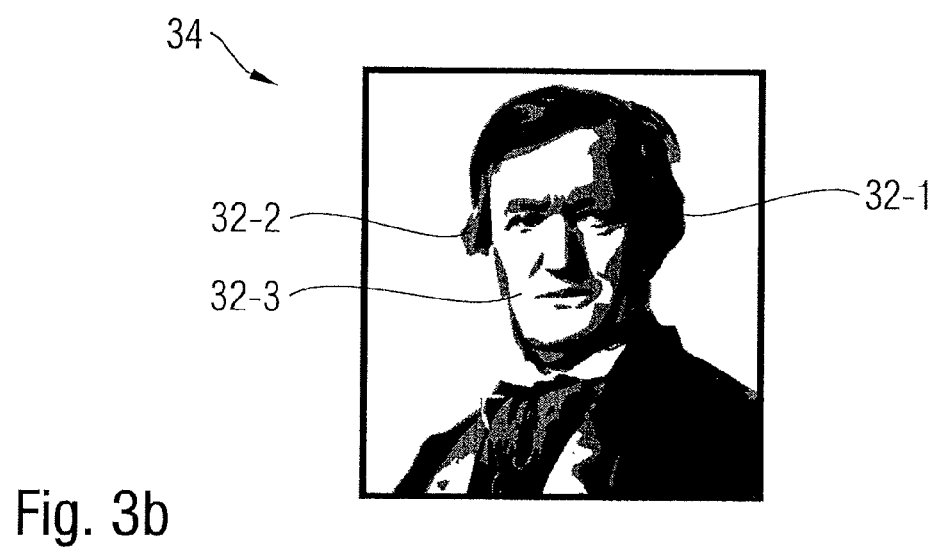
Figure 3C:
Figure 4:
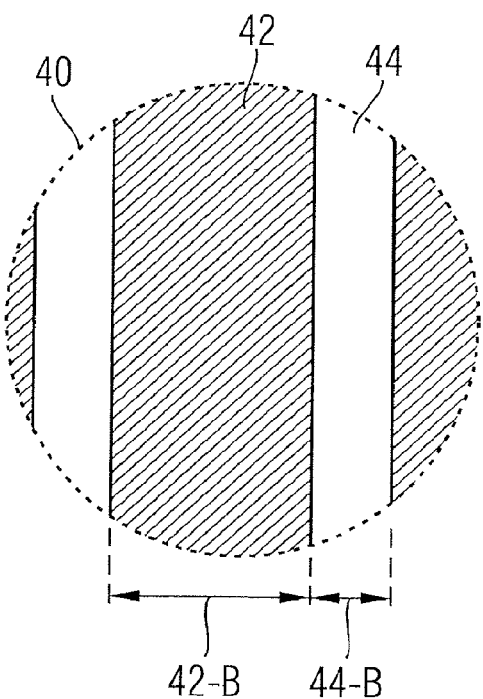
Figure 5:
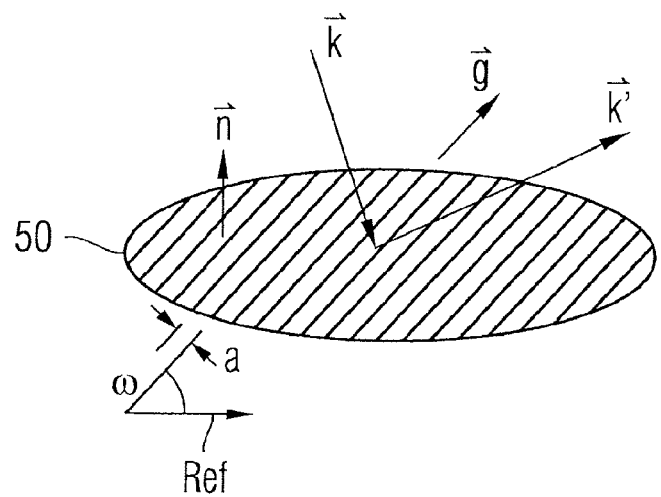

Shown are:

FIG. 1 a schematic diagram of a banknote having a grating image according to an exemplary embodiment of the present invention, FIG. 2 the grating image in FIG. 1, in detail, FIG. 3 in (a), a predefined screened halftone image, in (b), the unscreened halftone image obtained by combining pixels and having three brightness levels, and in (c), the contour lines of one of the areal regions of (b), FIG. 4 a section, covered with grating patterns, of a grating field of an unscreened halftone grating image, FIG. 5 the geometric relationships when viewing a grating image, for defining the occurring variables, and FIG. 6 in (a) and (b), in each case, grating fields having an electromagnetically active grating pattern and whose grating lines are oriented completely randomly to each other.

The invention will now be explained using a banknote as an example. FIG. 1 depicts a schematic diagram of a banknote 10 that is provided, on its front, with a grating image 12 according to the present invention. For this, in the exemplary embodiment, the grating image 12 was produced on a transfer element that is affixed to the banknote substrate.

It is understood that the present invention is not limited to transfer elements and banknotes, but rather can be used anywhere that grating images can be applied, such as in clock faces and costume jewelry, in labels on goods and packaging, in security elements on documents, identity cards, passports, credit cards, health cards, etc. In banknotes and similar documents, besides, for example, transfer elements, also security threads, and besides top view elements, also see-through elements, such as see-through windows, may be used for furnishing with grating images. This is described in detail in application PCT/EP2004/11497, whose disclosure in this respect is incorporated in the present application.

When illuminated, the grating image 12 depicted in detail in FIG. 2 displays an unscreened halftone image having multiple brightness levels that are produced by grating fields 22-1, 22-2 and 22-3 covered with different grating patterns. According to the present invention, the following procedure is used for manufacturing such an unscreened halftone grating image:

FIG. 3 shows first, in (a), a predefined halftone image 30 formed by a dot matrix R and whose dot matrix R comprises a two-dimensional array of pixels that are given in each case by their coordinates within the image depiction and a gray-brightness value. The dot matrix R typically constitutes a graphic image motif, such as the portrait W shown in the exemplary embodiment.

The dot matrix R can be present in digital form, for example in a raster graphics format such as GIF (Graphics Interchange Format), JPEG (Joint Photographics Expert Group), TIFF (Tagged Image File Format) or PNG (Portable Network Graphics).

For the sake of simplicity, the process is explained in the following based on a black-and-white halftone image. However, the method according to the present invention is, of course, also suitable for color images in which, for each pixel, a vector of a color space is specified, such as the RGB color model or the CMYK color model. In this case, three color separations that include the brightness values for the primary colors red, green and blue can, for example, take the place of the described black-and-white halftone image.

Returning to the depiction in FIG. 3, the entirety of the possible brightness values of the pixels of the dot matrix R is subdivided into a prechosen number of brightness levels. For example, in a halftone image that exhibits brightness values between 0 (darkest gray value) and 255 (lightest gray value), a breakdown into three brightness levels can be undertaken in that the brightness values 0 to 85 are allocated to brightness level 1 ("black"), the brightness values 86 to 171 to brightness level 2 ("gray"), and the brightness values 172 to 255 to brightness level 3 ("white").

Then those pixels of the dot matrix R whose brightness values lie within one of the predefined intervals are combined into areal image fields 32-1, 32-2 and 32-3, as shown in FIG. 3(b), such that, overall, an unscreened brightness level image 34 having three brightness levels is created.

The contour lines 36-1 of the areal image field 32-1 that is allocated to the brightness level 1 ("black") are depicted again separately in FIG. 3(c). As can be immediately perceived, the shape of the image field 32-1 (as well as the shape of the image fields 32-2 and 32-3) is determined only by the depicted motif after the pixels are combined, while the originally existing screening of the image is completely removed.

With reference to FIG. 2, in the grating image 12, grating fields 22-1, 22-2 and 22-3 are then defined that are allocated to the image fields 32-1, 32-2 and 32-3 and whose arrangement within the grating image corresponds to the arrangement of the image fields in the predefined halftone image. Corresponding to the brightness level in each case, the grating fields 22-1, 22-2 and 22-3 are covered with grating patterns that, when illuminated, produce in each case an areal region of the same brightness level.

FIG. 4 shows a section 40 of a region 22 that includes regions 42 that are filled with grating patterns and regions 44 that are unfilled. The filled regions 42 and the unfilled regions 44 are formed in each case in the shape of narrow strips having a width 42-B and 44-B, the relationship of the grating strip width 42-B to the total width of the grating strip and the gap strip, $B_{total}$=42-B+44-B, providing the desired brightness value of the region 22.

In order not to impair the optical impression of the halftone image, the total width of the grating strip and the gap strip, $B_{total}$, is chosen to be below the resolution limit of the human eye. In other exemplary embodiments, the total width can also be chosen to be larger such that the strip pattern further supports the image impression in the manner of a woodcarving or copperplate engraving.

It is understood that also another number of brightness levels than three can be chosen. However, the number N of brightness levels is preferably not too high and is especially below ten. To achieve a depiction having clear contours and an easily perceptible difference from conventional raster images, the conversion of raster images into brightness level images having three, four or five brightness values has proven to be particularly suitable.

To easily and non-holographically produce a planar or curved grating image that displays at least one unscreened halftone image having multiple brightness levels, the grating parameters can be calculated, for example, as described in PCT/EP2004/011497, whose disclosure in this respect is incorporated in the present application.

Summarized briefly, each grating pattern 50 (FIG. 5) is characterized by two grating parameters, namely the spacing a of the grating lines, which is referred to as the grating constant, and the azimuth angle ω that the grating lines enclose with a reference direction Ref, as shown in FIG. 5. The two designations can also be expressed by the grating vector $\vec{g}$ that represents a vector of the length 2π/a and that points in the direction parallel to the grating lines.

Also the geometric relationships when viewing the grating pattern 50 are schematically depicted in FIG. 5 for defining the occurring variables. The orientation of the grating field in space is specified by the normal vector $\vec{n}$, which represents a vector of length 1 that stands vertical on the grating plane. The incident light is characterized by one or more illumination vectors $\vec{k}$, which represent in each case a vector of length 2π/λ that points from the light source to the grating image. Here, λ is the wavelength of the light, such that monochromatic light is characterized by illumination vectors of the same length, and white light by illumination vectors of different lengths. The viewing vector $\vec{k}'$ is a vector of the length 2π/λ that points from the grating image to the eye of the viewer.

A grating field of a planar grating image is now visible for the viewer precisely when the above specified condition (G)

$$\vec{n} \times (\vec{k}' - \vec{k}) = m\vec{g}$$

is met for an integer m, since only then does a constructive interference of the reflected light beams in the viewing direction occur.

In addition to planar grating images, also curved grating images can be produced with the method according to the present invention. Unlike in planar grating images, in curved grating images, the normal vector is not a constant, but rather varies across the area of the grating image. Thus, to calculate a curved grating image, each grating image region is broken down into small sub-regions within which the normal vector $\vec{n}(\vec{r})$ for a reference test point P having the coordinates $\vec{r}=(x_0, y_0, z_0)$ can, in close approximation, be taken as a constant. The above described calculation of the grating constant a and the azimuth angle ω is then carried out for each of these sub-regions using the locally constant normal vector $\vec{n}(\vec{r})$.

In the most general case, it can be further accounted for in the calculation that, in the case of a spacious grating image and a finite distance between light source and viewer, both the illumination vector and the viewing vector are dependent on the position of the appropriate sub-region in the grating image, so are given by locally varying vectors $\vec{k}(\vec{r})$ and $\vec{k}'(\vec{r})$. The global relationship (G) then presents itself in the more general local form $$\vec{n}(\vec{r}) \times (\vec{k}'(\vec{r}) - \vec{k}(\vec{r})) = m\vec{g} \qquad (L).$$

This relationship (L) can, of course, also be used for the calculation of planar grating images, the normal vector $\vec{n}(\vec{r})$ being constant in this case, and only the illumination vector and the viewing vector varying across the area of the grating image.

After specifying the desired viewing conditions by the illumination and viewing direction, the desired geometry of the grating image and the desired brightness and color impression for each grating field, the grating parameters for each grating field can be calculated with the aid of the relationship (G) or (L). For details on the calculation, reference is made to publication PCT/EP2004/011497.

If the grating image is to display a true-color image, the following procedure can be used: From the true-color image, which can be predefined for instance in the RGB color space, three color separations are prepared for red, green and blue and, as described above, converted to areal regions having a predefined number of brightness levels. For example, each of the color separations can be converted to a color separation level image having five brightness levels.

The three color separation level images are then broken down into narrow strips and, in each case, two of three strips of each of the color separations are omitted. The remaining strips are then so nested within each other that one strip from the second and one strip from the third color separation come to lie where strips of the first color separation are missing. The further procedure follows, for example, PCT/EP2004/011497 in the description of FIG. 13 there. Instead of the three color separations for red, green and blue, other color systems with other color separations can, of course, also be used. Here, the primary colors in each case are depicted as spectral colors.

A further possibility for depicting true-color images through grating images is described in German patent application 10 2004 060 0672.2, whose disclosure in this respect is incorporated in the present application.

According to a further exemplary embodiment, an alternating image is to be executed, that is, depending on the viewing direction, a first or another image is to become visible. For this, each image is converted, as described above, from a predefined raster image to an areal image consisting of areas that are covered with one of N brightness levels. Thereafter, the same procedure is used as in PCT/EP2004/011497, in the description of FIG. 6 there, that is, the images are broken down into strips and every second strip of each of the images is omitted. The strips are then slid into each other such that one strip of the second image comes to lie where one strip of the first image is missing. These strips are then covered with different gratings such that they light up in the desired direction. Within each strip, the ratio of the area covered with gratings to the total area of the strip corresponds to the brightness value. The strip width plus the width of the gap preferably lies below the resolution capability of the eye or is chosen such that the strip pattern does not disrupt the image impression, but rather preferably further supports it, as in a woodcarving or copperplate engraving. The grating data are advantageously calculated as described above.

In further exemplary embodiments, more than two, for example m, images are to be visible alternatingly from different directions. The m images are present as dot matrices in digitalized format. As described above, areal images are first generated. These are subdivided into strips. Of each image, only every m-th strip is retained, the (m−1) strips lying therebetween are removed. The remaining strips of the m images are slid into each other such that, when the strips are appropriately covered with gratings, the m images become alternatingly visible from different viewing directions. The m-fold strip width preferably lies below the resolution capability of the eye or is chosen such that the strip pattern does not disrupt the image impression, but rather preferably further supports it, as in a woodcarving or copperplate engraving. The grating data are preferably calculated as described above.

In an exemplary embodiment, the m images of the above-described embodiment are created, for example, from two predefined images with the aid of a morphing computer program. For example, the portrait of a human and the face of a lion is predefined. With the aid of the morphing program, (m−2) interim images are computed that depict a slow transformation of the human face into a lion face. Now there are m raster images. These are further processed as described above such that, ultimately, a tilt image is obtained in which, when the image is tilted sideways in front of the viewer, a person slowly transforms into a lion and, when tilted back, becomes a person again.

In another exemplary embodiment, the m images are sub-images from a motion sequence that proceeds as in a flip-book when the image is tilted sideways in front of the viewer. The m images can also be m views of an object from different directions, the viewing directions between the views being chosen and the viewing distance of the viewer being incorporated such that, when the finished grating image is viewed, a three-dimensional-appearing image results.

According to a further exemplary embodiment, a grating image manufactured from a halftone image is to not only light up briefly in certain viewing directions when tilted, but rather always remain visible across a sizeable viewing angle range when tilted.

In the examples described, the strip breakdown was depicted as straight vertical strips, but also oblique or horizontal strips may be used. The strips need not be straight, they can also be curved or wavy.

The described embodiments can also be combined with each other, for example, a motion image can be executed in true colors and in stereo, or a true-color image can remain constant over a sizeable viewing range. If multiple effects are combined with each other, larger strip groups can occur that must be slid into each other such that, without further actions, the group width of strips lying next to each other would collectively lie above the resolution capability of the eye, which is to be avoided in some embodiments.

To explain, for example 10 motion levels of a motion image are to be executed in true colors, that is, in each case with the 3 color separations for red, green and blue. If 5 brightness levels are to be accounted for in each case, and 3 micrometers is set as the minimum strip width for an optically effective grating, then a strip group width of 10×3×5×3 micrometers=450 micrometers lying above the resolution capability of the eye first results. However, this strip group width can be reduced in that the individual strips are subdivided into sections, the size of the sections preferably lying below the resolution capability of the eye or being chosen such that the section pattern does not disrupt the image impression, but rather preferably further supports it, as in a woodcarving or copperplate engraving.

To avoid a displeasing matrix disrupting the image impression, the section division can be changed from strip to strip. An example is shown in table 1, a motion image having 10 motion levels and 3 color separations for red, green and blue being shown in 5 brightness levels in each case. The motion levels and the color separations are executed as strips, and the brightness levels as sections. The section division varies from strip to strip.

TABLE 1

| Strip no. | Motion state | Color separation | Number of grating lines per brightness level |
|---|---|---|---|
| 1 | 1st motion state | red | 8 |
| 2 | 1st motion state | green | 8 |
| 3 | 1st motion state | blue | 8 |
| 4 | 2nd motion state | red | 9 |
| 5 | 2nd motion state | green | 9 |
| 6 | 2nd motion state | blue | 9 |
| 7 | 3rd motion state | red | 10 |
| 8 | 3rd motion state | green | 10 |
| 9 | 3rd motion state | blue | 10 |
| 10 | 4th motion state | red | 11 |
| 11 | 4th motion state | green | 11 |
| 12 | 4th motion state | blue | 11 |
| ... | | | |
| 28 | 10th motion state | red | 17 |
| 29 | 10th motion state | green | 17 |
| 30 | 10th motion state | blue | 17 |

After the 30th strip, the cycle is repeated, if applicable with shifted phases such that no strip resembles another.

Table 2 now shows the section lengths within the strips in a division according to table 1. Here, the individual color separations were based on the following data:
  Red color separation: At wavelength 0.630 µm, under standard conditions, 0.891 µm grating line spacing is needed
  Green color separation: At wavelength 0.550 µm, under standard conditions, 0.777 µm grating line spacing is needed
  Blue color separation: At wavelength 0.470 µm, under standard conditions, 0.665 µm grating line spacing is needed Here, viewing vertically from above, illumination at 45° and a horizontal grating plane are considered standard conditions.

For the lowest brightness level in a strip, one section is covered according to table 2, then 4 uncovered sections follow, then a covered section again, then 4 uncovered sections. This sequence is continued in the same way. For the second brightness level in a strip, 2 sections are covered according to table 2, then 3 uncovered sections follow, then 2 covered sections again, then 3 uncovered sections, etc. For the third brightness level in a strip, 3 sections are covered according to table 2, then 2 uncovered sections follow, then 3 covered sections again, then 2 uncovered sections, etc. For the fourth brightness level in a strip, 4 sections are covered according to table 2, then an uncovered section follows, then 4 covered sections again, then an uncovered section, etc. For the fifth, the brightest brightness level in a strip, all sections are gaplessly covered according to table 2, that is, the section division is eliminated in the brightest brightness level.

TABLE 2

| Strip no. | Section length |
|---|---|
| 1 | 5 × 8 × 0.891 µm = 35.6 µm |
| 2 | 5 × 8 × 0.777 µm = 31.1 µm |
| 3 | 5 × 8 × 0.665 µm = 25.6 µm |
| 4 | 5 × 9 × 0.891 µm = 40 µm |
| 5 | 5 × 9 × 0.777 µm = 35 µm |
| 6 | 5 × 9 × 0.665 µm = 30 µm |
| 7 | 5 × 10 × 0.891 µm = 44.5 µm |
| 8 | 5 × 10 × 0.777 µm = 38.9 µm |
| 9 | 5 × 10 × 0.665 µm = 33.3 µm |
| 10 | 5 × 11 × 0.891 µm = 49 µm |
| 11 | 5 × 11 × 0.777 µm = 42.7 µm |
| 12 | 5 × 11 × 0.665 µm = 36.7 µm |
| ... | |
| 28 | 5 × 17 × 0.891 µm = 75.7 µm |
| 29 | 5 × 17 × 0.777 µm = 66 µm |
| 30 | 5 × 17 × 0.665 µm = 56.5 µm |

Since many sections add up in the total length of the strips, due to the unequally long sections, irregularly shifted sections result in the strips such that no screening can be created. Since the brightness levels are now accommodated in strip sections, the strip group width, at 3 micrometers×3×10=90 micrometers, lies below the resolution capability of the eye. The exemplary embodiment described represents only one example of how a screening can be avoided. In principle, all m images (in the above example 30 images, namely 10 motion states having 3 color separations) that are slid into each other are independent of one another and, according to the present invention, can be broken down differently as desired, as long as the sum of the m strip widths and section lengths lies below the resolution capability of the eye or is chosen such that the breakdown structure does not disrupt the image impression, but rather further supports it, as in a woodcarving or copperplate engraving. Due to the inventive differing breakdowns of the images slid into each other, no screening is created despite the vertical and horizontal division.

According to a further exemplary embodiment of the present invention, the grating fields can also entirely or partially include grating patterns that form a matte pattern, and thus display no diffractive effects when viewed.

Such matte patterns can be produced, for example, in that the grating lines in these grating fields are oriented randomly to each other. For illustration, FIG. 6 shows, in each of (a) and (b), grating fields 60 having electromagnetically active grating patterns whose grating lines 62 are oriented completely randomly to each other. The parameter "orientation" thus varies randomly and discontinuously across the area of the grating fields 60. The random variation continues outside of the sections shown in FIG. 6, across the entire area of the grating fields. Such randomly oriented, electromagnetically active grating patterns produce a non-diffractive matte pattern that clearly stands out from, for example, a directionally diffracting environment or a surrounding imprint.

Figure 6A:
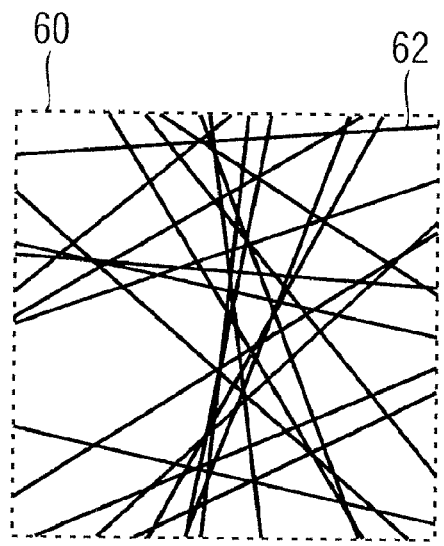
Figure 6B:
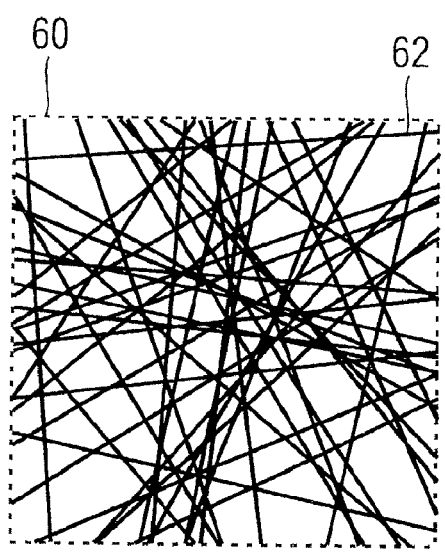

In the grating field 60 shown in FIG. 6(b), the grating lines fill the shown area less heavily than in FIG. 6(a). The grating field in FIG. 6(a) thus exhibits a less pronounced matte pattern effect than the grating field in FIG. 6(b) and, for that reason, appears darker to an observer. In this way, the differently bright regions of an areal image can be filled with differently bright matte patterns such that a matte pattern halftone image is created that can be viewed under widely differing illumination conditions (both spotlight and diffuse illumination).

In a further exemplary embodiment, first fractions of an areal image are executed in a matte pattern, while other fractions are covered with appropriately chosen diffractive structures. Since, as explained above, color and motion effects can be realized with the diffractive structures, there exists the possibility to manufacture unscreened halftone grating images having static image portions that are executed in a matte pattern, and dynamic image portions that are formed having diffractive structures.

The invention claimed is:

1. A grating image for depicting at least one unscreened halftone image having multiple brightness levels, wherein
  the grating image exhibits, by avoiding any screening, multiple areal, irregularly edged grating fields that include in each case an electromagnetic-radiation-influencing grating pattern composed of a plurality of grating lines and that, when illuminated, produce in each case an areal region of the halftone image having the same brightness level,
  the grating fields at least partially include grating patterns that are defined by a grating constant and an angular orientation, and/or at least partially include grating patterns that form a matte pattern that displays no diffractive effects when viewed, and
  the grating fields having grating patterns defined by a grating constant and an angular orientation are filled with the respective grating patterns in an areal fraction that corresponds to the brightness level produced, wherein the grating fields exhibit, corresponding to the brightness level produced, nested regions that are filled with grating patterns and regions that are unfilled, and the grating fields that form a matte pattern are filled, in a density that corresponds to the brightness level produced, with grating lines.

2. The grating image according to claim 1, characterized in that the unscreened halftone image exhibits fewer than ten brightness levels, preferably three, four or five brightness levels.

3. The grating image according to claim 1, characterized in that the grating lines in the grating fields that form a matte pattern are oriented randomly to each other, especially in that the orientation of the grating lines varies randomly and discontinuously.

4. The grating image according to claim 1, characterized in that, in at least one dimension, the extent of the filled and unfilled regions lies below the resolution limit of the naked eye.

5. The grating image according to claim 4, characterized in that the filled and unfilled regions are formed as narrow strips having a width below the resolution limit of the eye.

6. The grating image according to claim 4, characterized in that the filled and unfilled regions are formed as small areal elements of any shape having a size below the resolution limit of the eye.

7. The grating image according to claim 1, characterized in that the grating patterns are formed at least partially from uninterrupted grating lines and are produced by means of a lithography instrument.

8. The grating image according to claim 7, characterized in that the grating lines are connected, by turning sections disposed at their ends, to at least one grating line that runs in a meander shape.

9. The grating image according to claim 1, characterized in that, in different orientations, the grating image depicts an image in each case, especially an unscreened halftone image, such that an alternating image, a motion image, a stereo image, a backdrop image or a grating image having a constant image impression when in motion is created for the viewer.

10. The grating image according to claim 1, characterized in that the at least one of the unscreened halftone images depicted by the grating image is a true-color image.

11. An object, especially a data carrier or security element for application to a data carrier, having a grating image according to claim 1.

12. The object according to claim 11, characterized in that the object is a security element, especially a security thread, a label or a transfer element.

13. The object according to claim 11, characterized in that the object is curved in the region of the grating image, especially cylindrically curved.

14. The object according to claim 11, characterized in that the object is a data carrier, especially a banknote, a value document, a passport, an identification card or a certificate.

15. A use of a grating image according to claim 1 or of an object, especially a data carrier or security element for application to a data carrier, having said grating image, for securing goods of any kind.

16. A method for producing a grating image that displays at least one unscreened halftone image having multiple brightness levels, in which method the grating image is produced having, by avoiding any screening, multiple areal, irregularly edged grating fields that include in each case an electromagnetic-radiation-influencing grating pattern composed of a plurality of grating lines and that, when illuminated, produce in each case an areal region of the halftone image having the same brightness level, the grating fields are at least partially filled with grating patterns that are defined by a grating constant and an angular orientation and/or are at least partially filled with grating patterns that form a pattern that displays no diffractive effects when viewed, and wherein the grating fields having diffractive grating patterns are filled with the respective grating patterns in each case in an areal fraction that corresponds to the brightness level to be produced, wherein the grating fields are provided, corresponding to the brightness level to be produced, with nested regions that are filled with grating patterns and regions that are unfilled, and the grating fields that form a matte pattern are filled, in a density that corresponds to the brightness level to be produced, with grating lines.

17. The method according to claim 16, characterized in that
a) a screened black-and-white halftone image having a plurality of pixels is predefined, the pixels each exhibiting a gray-brightness value,
b) the pixels whose brightness values lie in a predefined interval are combined to form one image field in each case, such that an unscreened brightness level image having a prechosen number of discrete brightness levels is created,
c) grating fields of the grating image are defined that are allocated to the combined image fields and whose arrangement within the grating image corresponds to the arrangement of the image fields in the predefined halftone image, and
d) the grating fields are filled with grating patterns that, when illuminated, produce in each case an areal region of the same brightness level within the unscreened brightness level image, wherein the grating fields are provided, corresponding to the brightness level to be produced, with nested regions that are filled with grating patterns and regions that are unfilled.

18. The method according to claim 17, characterized in that the unscreened halftone image or the unscreened color separation level images in step b) are produced having fewer than ten brightness levels, preferably having three, four or five brightness levels.

19. The method according to claim 17, characterized in that the grating lines in the grating fields that form a matte pattern are produced having a random orientation to each other, preferably having a random and discontinuously varying orientation to each other.

20. The method according to claim 17, characterized in that, for the grating image, an orientation in space is defined in which the unscreened halftone image is visible, and in step d)
dd) one or more sub-regions within each grating field are defined and, for each of the sub-regions, from the defined orientation of the grating image and of the brightness value of the grating field, a grating pattern having a grating constant and an angular orientation is defined using the relationship $$\vec{n}(\vec{r}) \times (\vec{k}'(\vec{r}) - \vec{k}(\vec{r})) = m\vec{g}$$

wherein $\vec{r}$ constitutes a reference test point in the sub-region of the grating image, $\vec{n}(\vec{r})$, $\vec{k}'(\vec{r})$ and $\vec{k}(\vec{r})$ the normal vector, the viewing vector and the illumination vector at the reference test point $\vec{r}$, m the diffraction order and $\vec{g}$ the grating vector for the further sub-region.

21. The method according to claim 20, characterized in that the grating image, in different orientations, displays multiple images, especially multiple unscreened halftone images, the cited steps being carried out for each of the multiple images.

22. The method according to claim 21, characterized in that grating fields of each of the multiple images are nested within each other, for which the grating fields are preferably broken down into narrow strips and the narrow strips of the grating fields are disposed alternatingly next to each other.

23. The method according to claim 22, characterized in that the width of the narrow strips is chosen to be below the resolution limit of the naked eye, the narrow strips preferably being oriented parallel to a spin or tilt axis of the grating image.

24. The method according to claim 22, characterized in that the grating fields are broken down into small fractional regions of any shape, and the small fractional regions of the grating fields are disposed nested within each other.

25. The method according to claim 24, characterized in that at least one characteristic measurement of the small fractional regions is chosen to be below the resolution limit of the naked eye.

26. The method according to claim 16, characterized in that
   a) a screened color halftone image having a plurality of pixels is predefined, the pixels exhibiting in each case brightness values for certain primary colors,
   b) for each primary color, the pixels whose brightness values for this primary color lie in a predefined interval are combined in each case to form an image field such that, for each primary color, an unscreened color separation level image having a preselected number of discrete brightness levels is created,
   c) grating fields of the grating image are defined that are allocated to the combined image fields and whose arrangement within the grating image corresponds to the arrangement of the image fields in the predefined color halftone image, and
   d) the grating fields are subdivided into color sub-regions for the primary colors, and the color sub-regions are filled with grating patterns that, when illuminated, produce in each case an areal region of the same brightness level as the primary color within the unscreened brightness level image for this primary color.

27. The method according to claim 26, characterized in that spectral colors, especially red, green and blue, are chosen as primary colors.

28. The method according to claim 26, characterized in that, in at least one dimension, the extent of the color sub-regions lies below the resolution limit of the naked eye.

29. The method according to claim 26, characterized in that, for the grating image, an orientation in space is defined in which the unscreened color halftone image is visible, and in step d)
   dd) one or more further sub-regions within the color sub-regions of each grating field are defined and, for each of the further sub-regions, from the defined orientation of the grating image, the primary color and the brightness value of the color sub-region, a grating pattern having a grating constant and an angular orientation is defined using the relationship $$\vec{n}(\vec{r}) \times (\vec{k}'(\vec{r}) - \vec{k}(\vec{r})) = m\vec{g}$$

wherein $\vec{r}$ constitutes a reference test point in the sub-region of the grating image, $\vec{n}(\vec{r})$, $\vec{k}'(\vec{r})$ and $\vec{k}(\vec{r})$ the normal vector, the viewing vector and the illumination vector at the reference test point $\vec{r}$, m the diffraction order and $\vec{g}$ the grating vector for the further sub-region.

30. The method according to claim 16, characterized in that the grating patterns are formed at least partially from uninterrupted grating lines that run in a meander shape.

31. The method according to claim 16, characterized in that, in different orientations, the grating image displays different images such that, upon appropriate movement of the grating image, an alternating image is created for the viewer.

32. The method according to claim 16, characterized in that, in different orientations, the grating image displays an image motif in different states of motion such that, upon appropriate movement of the grating image, a motion image is created for the viewer.

33. The method according to claim 16, characterized in that, in different orientations, the grating image displays a growing or shrinking contour line of an image motif such that, upon appropriate movement of the grating image, a pump image is created for the viewer.

34. The method according to claim 16, characterized in that, from different viewing directions, the grating image displays at least two views of an image motif, and the different orientations of the views are defined based on a prechosen viewing distance for the grating image such that a stereo image of the image motif is created for the viewer.

35. The method according to claim 16, characterized in that, in different orientations, the grating image displays the same image, at least in a fractional region, such that, upon appropriate movement of the grating image, no change of the image content appears for the viewer in this fractional region.

36. The method according to claim 35, characterized in that the grating fields are broken down into narrow strips that are disposed next to each other and that are allocated to the images that are perceptible in different orientations, and that preferably are filled with grating patterns such that the end points of the grating pattern of one strip coincide with the beginning points of the grating pattern of the adjacent strip.

* * * * *